OR  3,594,060

SEARCH ROOM

[11] 3,594,060

ADDED

[72] Inventor Michael Anthony Lowe
    Basingstoke, England
[21] Appl. No. 854,411
[22] Filed Sept. 2, 1969
[45] Patented July 20, 1971
[73] Assignee United Kingdom Atomic Energy Authority
    London, England
[32] Priority Sept. 6, 1968
[33] Great Britain
[31] 42650/68

[54] HIGH-SPEED HOLOGRAPHIC CAMERA
    9 Claims, 3 Drawing Figs.
[52] U.S. Cl............................................ 350/3.5,
                                                      352/84
[51] Int. Cl....................................... G02b 27/00
[50] Field of Search............................... 350/3.5;
                                                  352/85, 84; 250/200, 201

[56] References Cited
    OTHER REFERENCES
Grobin et al., IBM TECHNICAL DISCLOSURE BULLETIN, Vol. 10, No. 3, Aug. 1967, PP 282— 3
Gates et al., HIGHSPEED PHOTOGRAPHY, Proc. of the 8th International Congress, Stockholm, June 1968, pp. 304—
Redman et al., IBID, pp. 317— 320

*Primary Examiner*—David Schonberg
*Assistant Examiner*—Ronald J. Stern
*Attorney*—Larson and Taylor ABSTRACT: This invention provides apparatus for producing successive three-dimensional images of high-speed events, e.g. stages of an explosion. A pulsed beam of laser light is divided into a reference and an object beam. The reference beam is reflected by a high-speed rotating mirror to a succession of fixed mirrors from which it is reflected on to a fixed photograph plate. The object beam, after reflection from or transmission through the high-speed event, is also reflected on to the plate. The pulsed laser beam is synchronized with the position of the rotating mirror by means of a continuous light beam which is reflected from the rotating mirror to a photodetector associated with each of the fixed mirrors, the laser being triggered by outputs from the successive photodetectors. The result is a number of multiplexed holograms of the event on the plate. Three-dimensional images of its successive stages can be viewed by substituting a continuous laser for the pulsed laser and viewing the developed plate while rotating the mirror slowly.

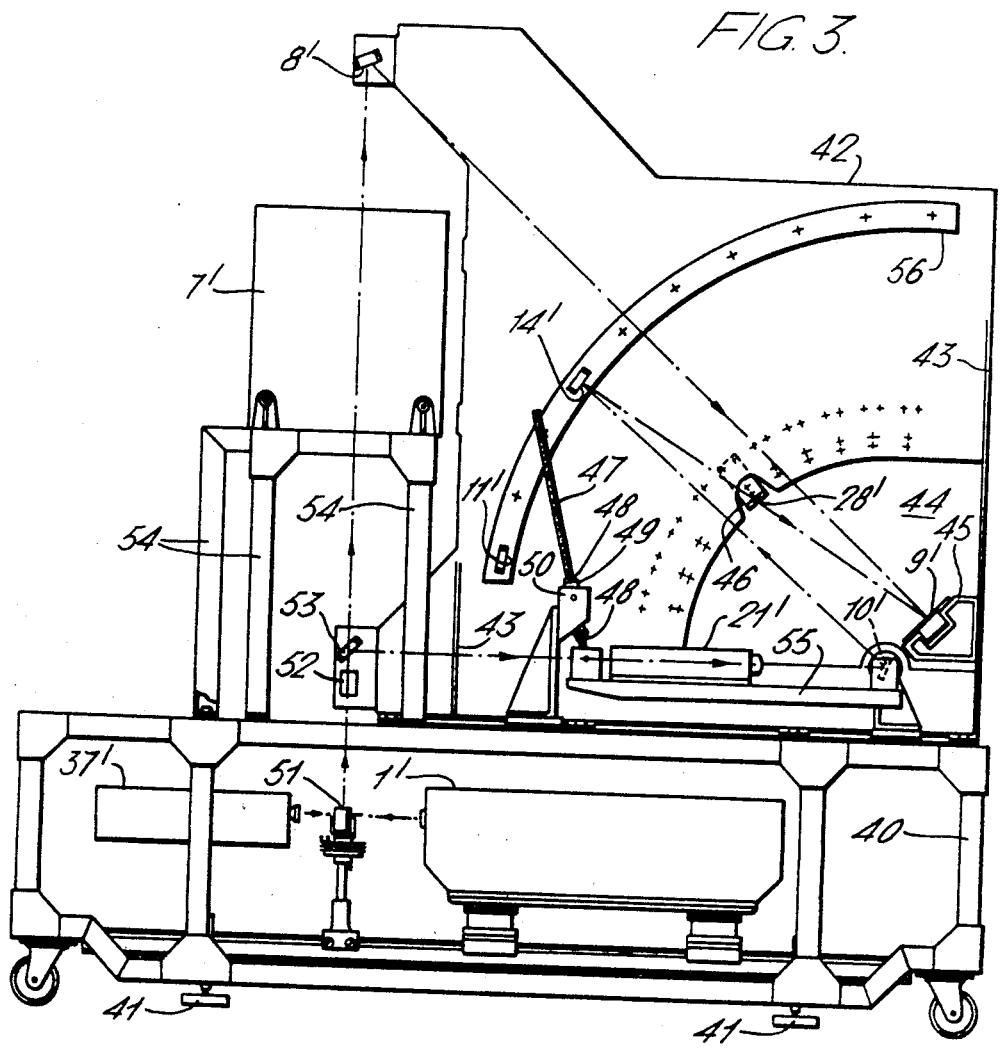

3,594,060

HIGH-SPEED HOLOGRAPHIC CAMERA

BACKGROUND OF THE INVENTION

This invention relates to holographic apparatus.

For the examination of high-speed events such as explosions, a form of camera is known in which an image of the event is projected on to a mirror rotating at high speed, from which the image is reflected on to an arcuate length of film in such a way that a succession of images of the event are recorded on the film representing successive stages in the event. These images are of course two-dimensional. For some purposes three-dimensional representations of the high-speed event are desirable, and it is one object of the present invention to provide apparatus for producing such representations.

SUMMARY OF THE INVENTION

According to the present invention holographic apparatus comprises a light source for producing a pulsed beam of coherent light, means for dividing said beam into a reference and an object beam, mirror means moveable about an axis for reflecting said reference beam successively on to a plurality of fixed mirrors, means for locating a photosensitive surface at a position to receive said reference beam as said reference beam is successively reflected from said fixed mirrors, means for directing said object beam on to said surface after transmission through or reflection from an object, and means for synchronizing the occurrence of said light pulses with the position of the moveable mirror means so that successive light pulses produce reference beams which are reflected from successive fixed mirrors on to the photosensitive surface.

Desirably the fixed mirrors are arranged to produce substantial coincidence of said beams at said photosensitive surface.

Desirably also, the path lengths of the reference beam from the source to said photosensitive surface via each fixed mirror are made approximately equal to one another and to the path length of the object beam, and must not differ by more than the coherence length of the light source. It is also desirable that the angular displacements between successive beams reflected from the fixed mirrors on to the photosensitive surface be made equal.

A suitable pulsed light source is a laser, preferably a Q-switched, solid-state laser.

The synchronizing means may comprise a light source for producing a continuous light beam directed on to the mirror means, a light-sensitive detector associated with each fixed mirror, and means operable by successive output signals from said detectors as said continuous beam is reflected on to successive detectors by said moveable mirror means for causing said pulsed light source to produce a pulse of light.

DESCRIPTION OF THE DRAWINGS

To enable the nature of the present invention to be more readily understood, attention is directed, by way of example, to the accompanying drawings wherein:

FIG. 3 is an elevation of a modified apparatus embodying the invention.

DESCRIPTION OF THE PREFERRED EMBODIMENTS

Figure 1:
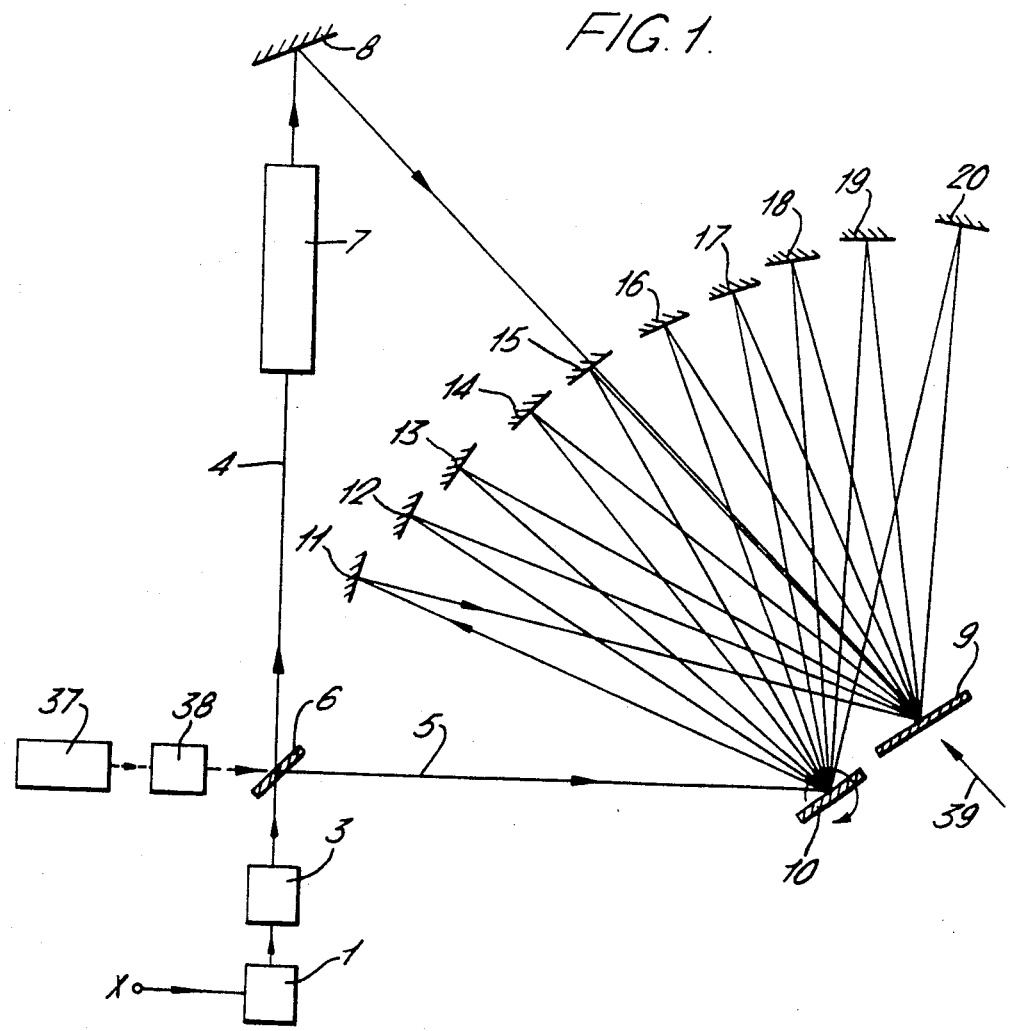
FIG. 1 is a diagrammatic plan view of part of a holographic apparatus embodying the present invention.

Referring to FIG. 1 a ruby laser 1 is Q-switched by a Pockels cell 2 (FIG. 2) in a known manner to produce light pulses approximately 30 nanosec. wide. The laser beam is broadened and collimated by a lens system 3, and split into an object beam 4 and a reference beam 5 by a dielectric beam-splitter 6. The object beam 4, after transmission through an object volume 7, e.g. an explosion, is reflected by a fixed mirror 8 on to a photosensitive plate 9.

The reference beam 5 is reflected by a rotating mirror 10 on to a succession of 10 fixed mirrors 11—20 arranged in an arcuate array, and thence on to plate 9. Mirrors 11—20 are arranged so that the successive reference beams therefrom coincide at plate 9, and so that the path lengths from source 1 to plate 9 via each mirror 11—20 are equal to one another and to the path length of beam 4 from source 1 via mirror 8. This allows holograms of the maximum depth of object to be produced, taking into account the limited coherence length of the pulsed ruby laser which is typically a few centimeters. As is well known, a hologram is not produced if the path lengths of the object and reference beams differ by more than the coherence length. Mirrors 10—20 are also arranged so that the angles between successive reference beams at plate 9 are equal, approximately 9° in this embodiment. Unequal angular displacements result in unequal time spacing between exposures, which causes laser pulse-amplitude variations because of the variations in pumping time.

The mirror 10 may be driven by an air turbine in a known manner at a speed which is variable up to, say, 5,000 rev./sec. For example at 2,500 rev./sec. the time interval between successive reference beams from mirrors 11—20 (9° displacement) will be 10 $\mu$ sec.

Figure 2:
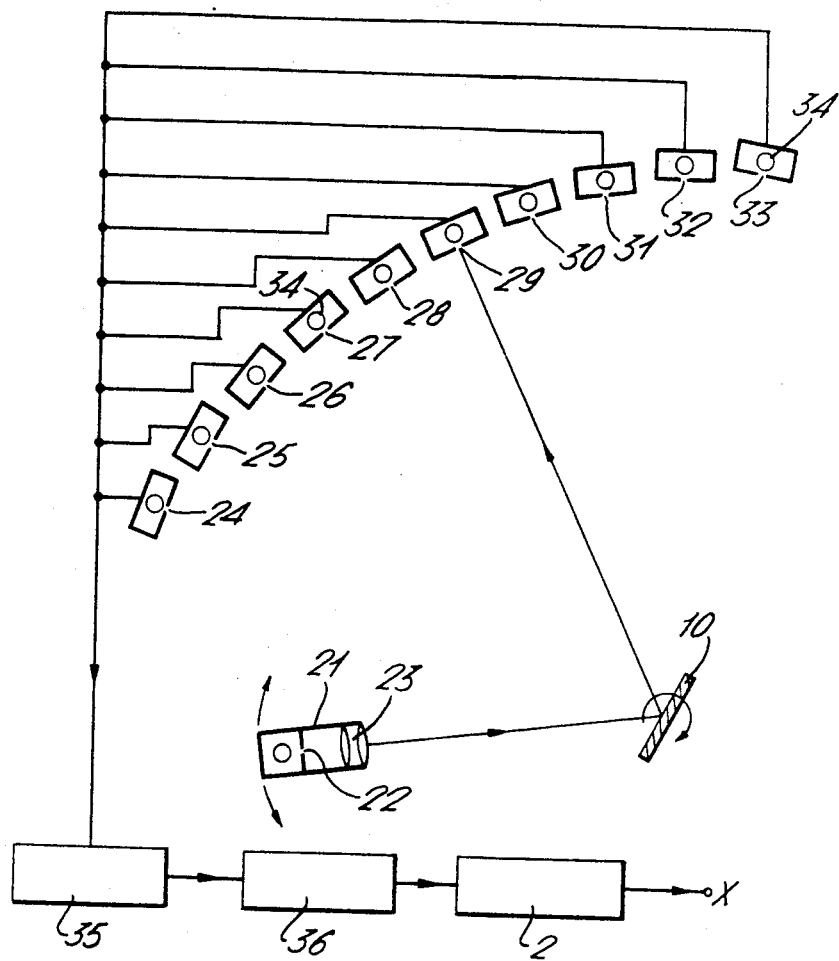
FIG. 2 is a similar view of another part of the apparatus of FIG. 1.

The production of light pulses from laser 1 is synchronized with the angular position of mirror 10 so that successive pulses occur at such times as to be reflected from successive mirrors 11—20 as mirror 10 rotates. FIG. 2 shows how this is effected in the present embodiment. From a lamp-house unit 21 mounted above the plane of the reference beams, the image of a vertical slit 22 is focused by a lens system 23 on to mirror 10, from which it is reflected to vertical slits 24—33 located below mirrors 11—20 respectively. Behind each slit is a photomultiplier tube 34. When the reflected image of slit 22 coincides with a slit 24—33, an output is obtained from the corresponding tube 34. The outputs of all the tubes 34 are fed to a pulse amplifier 35, thence to a Pockels cell drive-circuit 36, and thence to the Pockels cell 2 which Q-switches laser 1. The circuit delays occuring between the photomultipliers and the production of each laser pulse are compensated by adjusting the position of lamp-house 21 about the axis of mirror 10 so that the image of slit 22 coincides with each of slits 24—33 in advance of the required laser pulse by the total delay time.

The effect of the above-described apparatus is to form on the photosensitive plate 9 ten superimposed holograms of the event occurring in the object volume 7, at times spaced say 10 $\mu$ sec. apart. The production of a number of holograms on a single plate or film is well known in the holographic art and is sometimes termed "multiplexing."

Also shown in FIG. 1 is a continuous wave laser 37 followed by a beam expander 38, so mounted in relation to splitter 6 that they can provide continuous reference and object beams which coincide with beams 5 and 7 respectively. Laser 37 is used for alignment of the apparatus and for static setting up of the experimental event in the object volume 7.

The reference beam from laser 37 (the object beam therefrom being cut off) can also be used for viewing the developed hologram plate 9. By rotating mirror 10 slowly by hand, three-dimensional reconstructions of the event at successive times are seen by viewing plate 9 in the direction of arrow 39.

The above-described apparatus is suitable for making successive holograms with time intervals covering at least the range 20 $\mu$ sec. to 5 $\mu$ sec. i.e. laser pulse frequencies of 50—200 kHz., over which range the laser pulse width will remain substantially constant at about 30 nanosec. The latter constitutes, of course, the exposure time of each of the 10 multiplexed holograms.

It will be understood that in other embodiments the above-described arrangement can be turned through 90°, i.e. with the axis of mirror 10 horizontal instead of vertical. Such an embodiment is shown in FIG. 3.

In FIG. 3 components corresponding to those in FIGS. 1 and 2 are indicated by similar numerals, superscribed with a dash. In this drawing a wheeled chassis 40, fitted with jacks 41, supports a plate 42 strengthened by webs 43 and having a cutout portion 44. On the near side of the plate mirrors 11'—20' mounted on a machined arcuate flat 56, of which only mirrors 11' and 14' are shown. Each mirror can be moved about an axis normal to plate 42 and pivoted about a median axis parallel to plate 42 for adjustment. The means for effecting and locking these adjustments are familiar to those skilled in the optical arts and are omitted for clarity.

A rotating mirror 10' having its axis normal to plate 42 and incorporating conventional air-driven turbine is mounted at the center of the arc on which lie mirrors 11'—20'. A photographic plate 9' is mounted on a bracket 45 fastened to the plate 42. On the far side of plate, adjacent the edge of cutout 44, are mounted 10 housings 46 (of which only one is shown) each containing a photomultiplier tube 34' (not shown) and provided with slits 24'—33'. Each slit lies in a common plane with the axis of mirror 10' and is aligned at an angle to the plane of plate 42. A lamp-house 21' is mounted on an arm 46 which can be rotated about the axis of mirror 10' for adjustment. A threaded rod 47 pivoted to arm 55 carries nuts 48 which engage a sleeve 49 pivoted to a bracket 50. The position of housing 21' about the mirror axis can thus be adjusted by means of nuts 48. The housing 21' is aligned at an angle to the plane of plate 42 so that the light beam therefrom is reflected from mirror 10' to impinge on the correspondingly aligned slits 24'—33' on the far side of the plate. Only slit 28' is shown in the drawing.

Mounted below the plate 42 is a pulsed ruby laser light source 1' and a continuous wave laser light source 37'. The arrangement differs from that of FIG. 1, although the effect is similar. In FIG. 3 the beams from either of the sources 1' and 37' impinge on a mirror 51, which can be moved about a vertical axis to reflect either beam, as desired, to a further, fixed, mirror which is located behind mirror 51 and is thus hidden by it in the drawing. Thence the selected beam is reflected upwards via a beam-broadening lens system 52 (which replaces systems 3 and 38 in FIG. 1) to a beam-splitter 53. Thence the object beam traverses an explosion chamber 7' mounted on pillars 54 and provided with windows (not shown) in its upper and lower ends, to reach mirror 8', from which it is reflected to plate 9'. The reference beam from beam-splitter 53 impinges on mirror 10', passing between housing 21' and plate 42, and thence is reflected to each of the mirrors 11'—20' in turn as described with reference to FIG. 1.

The mirror hidden behind mirror 51, beam-splitter 53 and mirror 8' are all provided with suitable known adjusting means, as in the case of mirrors 11'—20'.

Although the dimensions of the apparatus are not critical, in the embodiment of FIG. 3, which is approximately to scale, the radius of the arc on which lie mirrors 11'—20', and having mirror 10' at its center, is 35.5 inches. The slits 24'—33' are 20 thousandths of an inch wide.

The corresponding slit in housing 21' is adjustable and is normally made wider than the slits 24'—33', e.g. twice as wide, to ensure coverage thereof.

In FIG. 3 each slit 24'—33' lies in a common radial plane with the center of its associated fixed mirror 11'—20' and the axis of mirror 10'. This is a convenient arrangement but is not essential, as the timing of the light pulses relative to the position of mirror 10' is adjustable by the position of housing 21'.

The apparatus of FIG. 3 is designed to be operated in a darkened room, but can alternatively be provided with a lighttight cover.

I claim:

1. High-speed hologram forming apparatus comprising a light source for producing a pulsed beam of coherent light, means for dividing said beam into a reference and an object beam, mirror means moveable about an axis for reflecting said reference beam successively on to a plurality of spaced fixed mirrors, means for locating a photosensitive surface at a position to receive said reference beam as said reference beam is successively reflected from said fixed mirrors, means for directing said object beam on to said surface after modulation by an object, and means for synchronizing the occurrence of said light pulses with the position of the moveable mirror means so that successive light pulses produce reference beams which are reflected from successive fixed mirrors on to the photosensitive surface, said synchronizing means comprising a second light source for producing a continuous light beam directed on to the mirror means, a light-sensitive detector associated with each fixed mirror, and means operable by successive output signal from said detectors as said continuous beam is reflected on the successive detectors by said moveable mirror means for causing said pulsed light source to produce a pulse of light.

2. Apparatus as claimed in claim 1 wherein the fixed mirrors are arranged to produce substantial coincidence of said beams at said photosensitive surface.

3. Apparatus as claimed in claim 1 wherein the path lengths of the reference beam from the source to said photosensitive surface via each fixed mirror are made approximately equal to one another and to the path length of the object beam.

4. Apparatus as claimed in claim 1 wherein the angular displacements between successive beams reflected from the fixed mirrors on to the photosensitive surface are made equal.

5. Apparatus as claimed in claim 1 wherein the pulsed light source is a laser.

6. Apparatus as claimed in claim 6 wherein the laser is a Q-switched, solid-state laser.

7. Apparatus as claimed in claim 1 comprising a light source for producing a continuous beam of coherent light, and means for substituting said continuous beam for said pulsed beam before division into reference and object beams.

8. Apparatus as claimed in claim 2 wherein the fixed mirrors are located on an arc having the axis of the moveable mirror at its center.

9. Apparatus as claimed in claim 1 wherein each said detector is located substantially in a common radial plane with its associated fixed mirror and the axis of the moveable mirror means.